United States Patent [19]

Murakami et al.

[11] Patent Number: 5,139,843
[45] Date of Patent: Aug. 18, 1992

[54] ELONGATED LIGHTWEIGHT FIBER REINFORCED COMPOSITE RESIN PULTRUSION-FORMED PIECE

[75] Inventors: Shinkichi Murakami; Keiziro Manabe; Makizi Miyao; Yasutaka Ishida; Akihiro Atsumi; Hiroshi Inoue, all of Saitama, Japan

[73] Assignee: Tonen Kabushiki Kaisha, Tokyo, Japan

[21] Appl. No.: 439,997

[22] Filed: Nov. 21, 1989

[30] Foreign Application Priority Data

Nov. 24, 1988 [JP] Japan ................... 63-296761

[51] Int. Cl.⁵ ............................ B32B 3/12
[52] U.S. Cl. ........................ 428/116; 52/806; 493/966
[58] Field of Search ............. 428/73, 116, 117, 118, 428/966; 52/806

[56] References Cited

U.S. PATENT DOCUMENTS

| | | | |
|---|---|---|---|
| 2,477,852 | 8/1949 | Bacon | 428/116 |
| 3,138,506 | 6/1964 | Ross | 428/116 X |
| 3,211,253 | 10/1965 | Gonzalez | 428/116 X |
| 4,053,447 | 10/1977 | Shea | 428/289 X |
| 4,084,029 | 4/1978 | Johnson et al. | 428/119 |
| 4,186,044 | 1/1980 | Bradley et al. | 156/275.5 |
| 4,223,053 | 9/1980 | Brogan | 428/116 X |
| 4,956,393 | 9/1990 | Boyd et al. | 428/378 X |
| 4,980,214 | 12/1990 | Charriere | 428/73 X |

Primary Examiner—Henry F. Epstein
Attorney, Agent, or Firm—Seidel, Gonda, Lavorgna & Monaco

[57] ABSTRACT

An elongated lightweight fiber reinforced composite resin pultrusion-formed piece with a rectangular structural shape has an elongated light honeycomb structure body with a rectangular sectional shape and at least one fiber reinforced resin layer formed to cover at least a portion of the outer peripheral surface of the lightweight honeycomb structure body. The fiber reinforced resin layer comprises an axial fiber layer formed by aligning reinforcing fibers parallel to the longitudinal axis of the lightweight honeycomb structure body.

2 Claims, 3 Drawing Sheets

ELONGATED LIGHTWEIGHT FIBER REINFORCED COMPOSITE RESIN PULTRUSION-FORMED PIECE

BACKGROUND OF THE INVENTION

This invention relates to an elongated lightweight fiber reinforced composite resin pultrusion-formed piece in which a layer of a fiber reinforced resin is formed on a surface of an elongated honeycomb structure, and also to a method of manufacturing this type of formed piece.

An elongated lightweight fiber reinforced composite resin pultrusion-formed piece in accordance with the present invention is formed as an elongated member having a rectangular sectional shape, is capable of suitably resisting a bending force as well as axial tensile and compressive forces, and can be used as, for example, frame members and mechanical parts in the fields of aircraft, outer space, motor vehicles, ships and railroads, as structural framework members such as pillars in the fields of civil engineering work and architecture, or as light structural members in other various fields.

Elongated light structural members are in demand in these various fields. Conventionally, fiber reinforced composite members having reinforcing fibers such as carbon fibers or glass fibers have been proposed as this type of structural member. A composite member is formed into a shape of a pipe for a reduction in the overall weight. For a further reduction in the weight, the pipe tends to be reduced in thickness. If the thickness of the pipe is reduced, the bending strength and the compressive strength (buckling resistance) in a direction perpendicular to the axial direction are reduced. There is therefore a limit of the reduction in the thickness. In particular, in the case of pultrusion, the problem of occurrence of damage to the formed piece in a mold and in an extracting unit is encountered, and it is therefore difficult to form the desired product by pultrusion.

The inventors of the present invention have found that an elongated lightweight fiber reinforced composite resin pultrusion-formed piece improved in bending strength and compressive strength in a direction perpendicular to the axial direction (buckling resistance) as well as in tensile strength and compressive strength in the axial direction can be realized by forming a thin fiber reinforced resin layer on the outside surface of an elongated light reinforcing member constituted by an elongated honeycomb structure body formed of paper, a plastic or a light metal, and that this type of formed piece can be suitably manufactured by the ordinary pultrusion method.

Such an elongated honeycomb structure body can serve as a mandrel when the formed piece is manufactured by the pultrusion method, thereby eliminating the need for separately providing a mandrel while ensuring that the formed piece can be manufactured at a high speed with improved efficiency and without any damage.

The present invention has been achieved on the basis of this finding.

SUMMARY OF THE INVENTION

An object of the present invention is to provide an elongated lightweight fiber reinforced composite resin pultrusion-formed piece and a method of manufacturing the same, the formed piece being improved in bending strength and compressive strength in a direction perpendicular to the axial direction (buckling resistance) as well as in tensile strength and compressive strength in the axial direction and having a rectangular sectional shape suitable for being used as light weight structural members in various fields.

Another object of the present invention is to provide an elongated lightweight fiber reinforced composite resin pultrusion-formed piece and a method of manufacturing the same on the basis of pultrusion with improved efficiency and without necessitating any special mandrel while avoiding the risk of any damage to the formed piece.

To achieve these objects, according to the present invention, there is provided an elongated lightweight fiber reinforced composite resin pultrusion-formed piece comprising an elongated light honeycomb structure body and at least one fiber reinforced resin layer formed to cover the whole or a part of the outer peripheral surface of the lightweight honeycomb structure body. A bonding layer may be interposed between the honeycomb structure body and the fiber reinforced resin layer. The honeycomb structure body is formed of paper, a plastic such as aramid or a light metal, reinforcing fibers of the fiber reinforced resin layer are carbon fibers, glass fibers or aramid fibers, and the matrix resin with which the fibers are impregnated is a thermosetting resin, such as epoxy, unsaturated polyester or vinyl ester, or a thermoplastic resin, such as nylon 6, nylon 66, polycarbonate, polyacetal, polyphenylene sulfide or polypropylene.

This elongated lightweight fiber reinforced composite resin pultrusion-formed piece can be suitably manufactured by a method of manufacturing an elonagated lightweight fiber reinforced composite resin pultrusion-formed piece, comprising the steps of; (a) preparing an elongated honeycomb structure body; (b) forming a bonding layer on at least a portion of the outer peripheral surface of the honeycomb structure body if necessary; (c) placing fibers impregnated with a resin on the honeycomb structure body to form a fiber reinforced resin layer having a predetermined thickness; and (d) drawing the light weight reinforced member having the fiber reinforced resin layer into a mold to form the same in the desired shape of the desired size and to thereafter solidify the reinforced member.

DEFINITIONS

As used herein the term "pultrusion", when used by itself or to describe the method in which a piece is formed, refers to a process which includes pulling fibers through a resin bath and then through a forming die. Pultrusion processes are well known in the fabrication industry. Any such pultrusion process which can be adapted to produce the desired features of this invention can be employed.

DESCRIPTION OF THE PREFERRED EMBODIMENTS

Elongated lightweight fiber reinforced composite resin pultrusion-formed pieces in accordance with the present invention will be described below in more detail.

Figure 1:
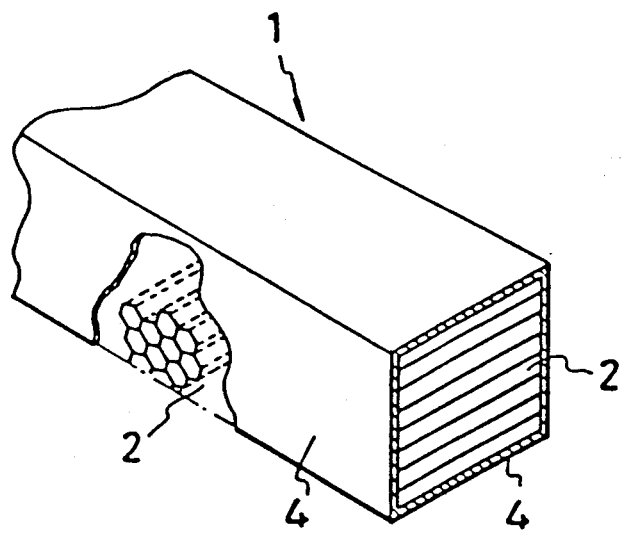
FIG. 1 is a perspective view of an elongated lightweight fiber reinforced composite resin pultrusion-formed piece in accordance with the present invention.

FIG. 1 shows an elongated lightweight fiber reinforced composite resin pultrusion-formed piece 1 having a rectangular sectional shape in accordance with the present invention. In this embodiment of the present invention, the elongated lightweight fiber reinforced composite resin pultrusion-formed piece 1 consists of an elongated light reinforcing member, i.e., a honeycomb structure body 2 having a rectangular sectional shape, and a layer 4 of a fiber reinforced resin formed to cover the whole peripheral surface of the honeycomb structure body 2. The honeycomb structure body 2 may preferably be formed of an aluminum honeycomb product on the market, e.g., AL1/8-5052-.0.02 (a commercial name of a product made by Showa Aircraft Industry Co., Ltd.). The honeycomb structure member may be formed from various light materials other than aluminum, including a light metal such as duralumin, paper, a plastic such as aramid resin.

Figure 2:
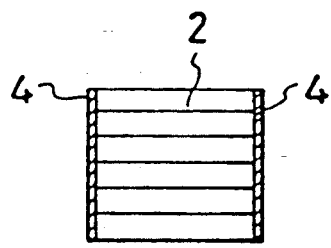
FIGS. 2, 3, 4A and 4B are cross-sectional views of elongated lightweight fiber reinforced composite resin pultrusion-formed pieces which represents embodiments of the present invention.

According to the present invention, it is not always necessary to form fiber reinforced resin layer 4 on the whole peripheral surface of the honeycomb structure body 2, and the honeycomb structure body 2 may be partially covered with fiber reinforced resin layer 4, as shown in FIG. 2. In the embodiment shown in FIG. 2, for improvement in compressive strength, fiber reinforced resin layer 4 is formed on two opposite side surfaces of the honeycomb structure body 2 at which the openings of honeycomb cells are positioned.

According to the present invention, as will be explained later, it is preferable to dispose the honeycomb core in such a manner that honeycomb cell openings are positioned at two sides at the time of manufacture as shown in FIG. 1, in order to prevent an unset liquid matrix resin having a certain fluidity from penetrating from fiber reinforced resin layers fitted around the honeycomb structure body to the interior of the honeycomb structure body through the cell openings thereof during pultrusion.

Figure 3:
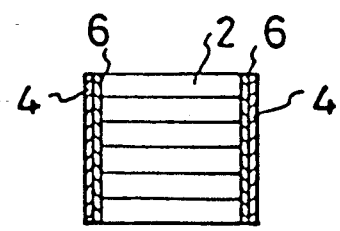

It is also preferable to attach an adhesive tape 6 to the cell openings of the honeycomb structure body as shown in FIG. 3 before the formation of fiber reinforced resin layer 4 to prevent the matrix resin from penetrating to the interior of the honeycomb structure body through the cell openings thereof during manufacture. The adhesive tape 6 may be a thermosetting type pressure sensitive adhesive tape or a tape with a pressure sensitive adhesive applied to the two surfaces of the tape. The adhesive tape 6 serves to increase the strength of connection between the honeycomb structure body 2 and the fiber reinforced resin layer 4 and, hence, to improve the bending strength and the compressive strength of the resulting fiber reinforced composite resin pultrusion-formed piece 1. For example, FM 123-5 Adhesive Film (a commercial name of a product made by American Cyanamide Company) may preferably be used as the adhesive tape 6.

Figure 4A:
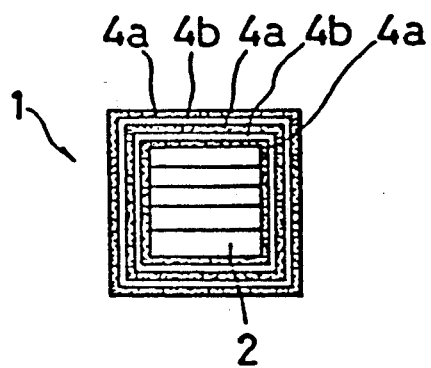

FIG. 4A shows still another embodiment of the present invention. In accordance with this embodiment the elongated lightweight fiber reinforced composite resin pultrusion-formed piece 1 may have a construction such that the fiber reinforced resin layer 4 formed to cover the whole peripheral surface of the light reinforcing member 2 comprises an axial fiber layer 4a formed by aligning reinforcing fibers parallel to the longitudinal axis of the light reinforcing member 2, and a spiral fiber layer 4b formed by spirally winding reinforcing fibers at a predetermined angle to the axis. Also, a plurality of axial fiber layer 4a and a plurality of spiral fiber layers 4b may be formed by being alternately superposed on each other. The inner most layer may be formed of axial fiber layer 4a as shown in FIG. 4A, or it may be formed of spiral fiber layer 4b. The outermost layer may be formed of spiral fiber layer 4b, but it is more preferable to form an axial fiber layer 4a on the spiral fiber layer 4b as shown in FIG. 4A. This is because the pultrusion-formed piece can be manufactured smoothly in a continuous manufacture process if the outermost layer is formed of axial fiber layer 4a.

It is possible to select as desired the angle to the axial direction at which each spiral fiber layer 4b is wound, the density of fiber of each of fiber layers 4a and 4b, the thickness of each layer, and so on. For example, the winding angle is 45° to 80°, and the fiber content in fiber layers 4a and 4b is preferably 50 to 60% by volume.

The reinforcing fiber and the matrix resin for fiber reinforced resin layers 4 may be of any type. However, ordinarily, carbon fiber, glass fiber or aramid fiber may preferably be used as the reinforcing fiber, and the matrix resin with which the reinforcing fiber is impregnated may be a thermosetting resin, such as epoxy, unsaturated polyester or vinyl ester, or a thermoplastic resin, such as nylon 6, nylon 66, polycarbonate, polyacetal, polyphenylene sulfide or polypropylene. Fillers, such as $CaCO_3$, mica, $Ae(OH)_3$ or talc, additives for improving the heat resistance and the weathering resistance and coloring agents may be added to the matrix resin if necessary. It is preferable to set the fiber content in the fiber reinforced resin layer 4 to about 50 to 60% by volume, as mentioned above.

Figure 4B:
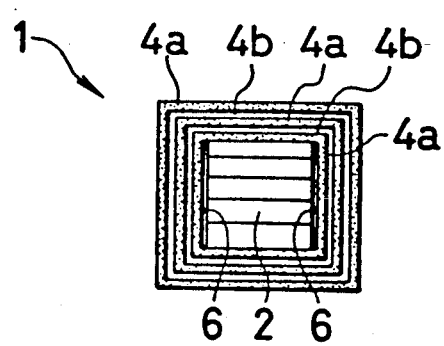

In this embodiment also, it is preferable to attach an adhesive tape 6 to the cell openings of the honeycomb structure body as shown in FIG. 4B before the formation of fiber reinforced resin layer 4, i.e., axial fiber layer 4a forming the innermost layer in this embodiment, in order to prevent the matrix resin from penetrating to the interior of the honeycomb structure body through the cell openings thereof during manufacture. The adhesive tape 6 may be a thermosetting type pressure sensitive adhesive tape or a tape with a pressure sensitive adhesive applied to the two surfaces of the tape. The adhesive tape 6 serves to increase the strength of connection between the honeycomb structure body 2 and the fiber reinforced resin layer 4a and, hence, to improve the bending strength and the compressive strength of the resulting fiber reinforced composite resin pultrusion-formed piece 1. For example, FM 123-5 Adhesive Film (a commercial name of a product made by American Cyanamide Company) may preferably be used as the adhesive tape 6, as mentioned above.

For the purpose of increasing the bending strength and the compression strength of the fiber reinforced composite resin pultrusion-formed piece, other adhesive layer formed of the adhesive tape 6 may be provided to cover portions of the honeycomb structure body other than the cell openings or to cover the whole peripheral surface of the honeycomb structure member.

Next, a method of manufacturing the elongated lightweight fiber reinforced composite resin pultrusion-formed piece in accordance with the present invention will be described below.

Figure 5:
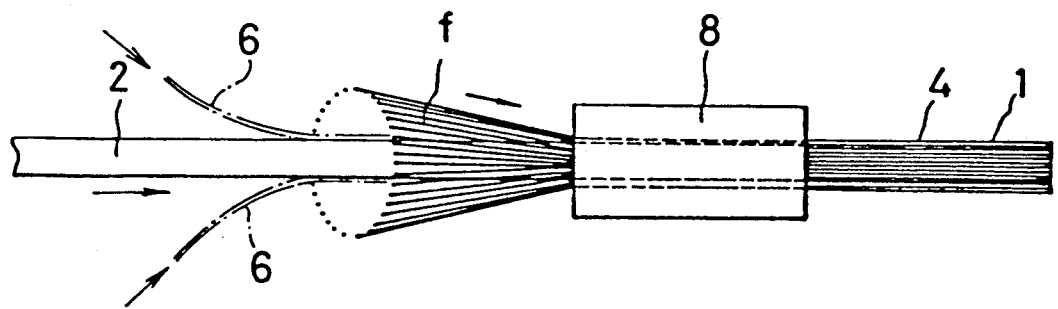
FIGS. 5 and 6 are schematic diagrams of a process of manufacturing an elongated lightweight fiber reinforced composite resin pultrusion-formed piece in accordance with the present invention.

Referring to FIG. 5, a honeycomb structure body 2 having an elongated shape is continuously supplied to a mold (dies) 8. Adhesive tapes 6 are attached to the whole or part of the peripheral surface of the honeycomb structure body 2 if necessary. On the other hand, reinforcing fibers f impregnated with a matrix resin are supplied to the periphery of the honeycomb structure body 2 and are drawn into the mold 8 together with the honeycomb structure body 2. A fiber reinforced resin layer 4 is formed in the mold to have the desired shape and size and is solidified.

In a case where the fiber reinforced resin layer 4 comprises a plurality of layers, i.e., axial fiber layers 4a and spiral fiber layers 4b, resin-impregnated fibers are disposed on the honeycomb structure body 2 so as to extend along the longitudinal axis thereof or are spirally wound around the honeycomb structure body 2 with an adhesive layer 6 interposed between the fibers and the honeycomb structure body 2 if necessary, thereby forming a first fiber layer having a predetermined thickness, and, prior to the setting of the first fiber layer, other resin-impregnated fibers are arranged on the first fiber layer so as to extend in a direction different from the direction in which the fibers of the first fiber layer extend, thereby forming a second fiber layer. The above processing steps are repeated a number of times selected as desired to form the fiber reinforced resin layer 4 as an unset fiber layer lamination having axial fiber layers and spiral fiber layers. The honeycomb structure body 2 on which the fiber reinforced resin layer 4 is formed is drawn into the mold 8, and the fiber reinforced resin layer 4 is formed in the mold to have the desired shape and size and is solidified, as shown in FIG. 5.

The above pultrusion process can be suitably carried out by employing an ordinary over-winder.

Next, a process in which a carbon fiber reinforced composite resin pultrusion-formed piece in accordance with the present invention, such as that shown in FIG. 4, is formed by employing an over-winder will be described below with reference to FIG. 6.

Figure 6:
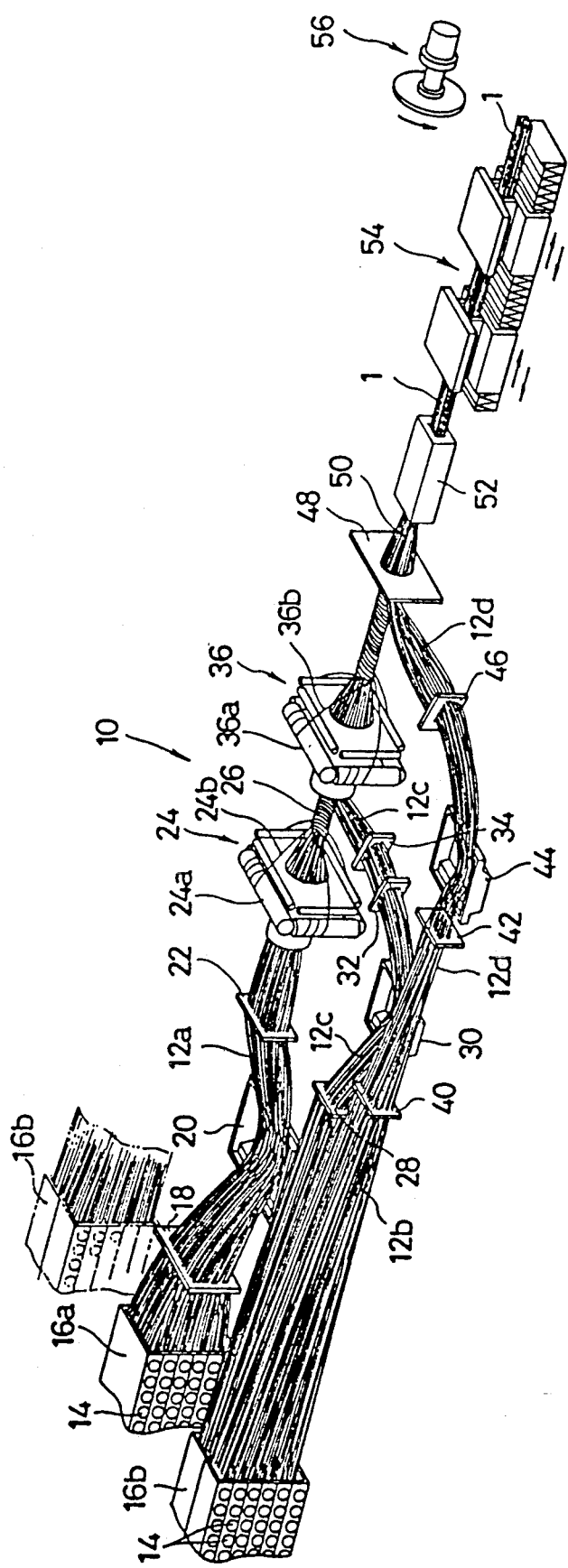

FIG. 6 shows an example of a pultrusion forming machine 10 for manufacturing a carbon fiber reinforced composite resin pultrusion-formed piece 1 having the above-described rectangular sectional configuration. Specifically, in this example, the carbon fiber reinforced composite resin pultrusion-formed piece 1 has a five-layer structure in which are formed, from the innermost position, an axial L carbon fiber reinforced resin layer 4a, a spiral carbon fiber reinforced resin layer 4b, another axial carbon fiber reinforced resin layer 4a, another spiral carbon fiber reinforced resin layer 4b, and a still another carbon fiber reinforced resin layer 4a, as shown in FIG. 4.

The pultrusion forming machine 10 has a multiplicity of creels 14 around which carbon fibers 12 are wound and which are axially supported in creel stands (16a, 16b). In this example, three creel stands 16 are provided. Carbon fibers 12a from a first creel stand 16a are introduced into a resin impregnation bath 20 while being guided by a guide plate 18, thereby being impregnated with a matrix resin. After being squeezed to remove a superfluous part of the resin, the resin-impregnated carbon fibers 12a are supplied to an over-winder 24 while being guided by a guide plate 22 and are attached to a mandrel 26 or an elongated honeycomb structure body 2 in accordance with the present invention set in the over-winder 24 so as to extend parallel to the longitudinal axis thereof (to form an axial carbon fiber reinforced resin layer 4a as the innermost layer). Simultaneously, carbon fibers 24b paid out from a plurality of creels 24a mounted on the over-winder 24 are wound on the axial carbon fiber reinforced resin layer 4a attached longitudinally at a predetermined winding angle of, e.g., 70°, thereby forming a spiral carbon fiber reinforced resin layer 4b. The carbon fibers from the creels 24a are not impregnated with the matrix resin but they are impregnated with a certain amount of the matrix resin from the inner-layer axial carbon fiber reinforced resin layer when wound around the honeycomb structure body 2 and are also impregnated with a superfluous part of the matrix resin from another axial carbon fiber reinforced resin layer attached longitudinally at the next processing step.

Second and third creel stands 16b are disposed on opposite sides of the creel stand 16a symmetrically about the same. Since the second and third creel stands 16b operate in the same manner, the operation of one of them located on the front side as viewed in FIG. 6 will be explained below while the description for the other is omitted. Fibers 12c among carbon fibers 12b paid out from the creel stand 16b are introduced into a resin impregnation path 30 while being guided by a guide plate 28, thereby being impregnated with the matrix resin. After being squeezed to remove a superfluous part of the resin, the resin-impregnated carbon fibers 12c are supplied to an over-winder 36 while being guided by guide plates 32 and 34. The resin-impregnated carbon fibers 12c are supplied to the honeycomb structure body 2 parallel to the axial direction thereof. At this time, the honeycomb structure body 2 passes through central portions of the over-winders 24 and 36 and the two layers, i.e., the axial fiber layer and the spiral fiber layer are formed on the honeycomb structure body 2. The carbon fibers 12c are placed on the spiral carbon fibers 24b while extending parallel to the longitudinal axis of the honeycomb structure body 2 (to form a second axial carbon fiber reinforced resin layer 4a). Simultaneously, carbon fibers 36b paid out from a plurality of creels 36a mounted on the over-winder 36 are wound on the axial carbon fiber reinforced resin layer 4a attached longitudinally at a predetermined winding angle of, e.g. 70°, thereby forming another spiral carbon fiber reinforced resin layer 4b. The direction of rotation of the over-winder 36 is opposite to that of the over-winder 24. Accordingly, the winding direction of the spiral carbon fiber reinforced resin layer 4b formed by the over-winder 36 is opposite to that of the other spiral carbon fiber reinforced resin layer 4b formed by the over-winder 24. The carbon fibers from the creels 36a are not impregnated with the matrix resin but they are impregnated with a certain amount of the matrix resin from the inner-layer axial carbon fiber reinforced resin layer when wound around the mandrel and are also impregnated with a superfluous part of the matrix resin from another axial carbon fiber reinforced resin layer attached longitudinally at the next processing step.

The rest of the fibers paid out from the second creel stand 16b, i.e., carbon fibers 12d other than the carbon fibers 12b are introduced to a resin impregnation bath 44 while being guided by guide plates 40 and 42, are impregnated with the matrix resin, and are then squeezed to remove a superfluous part of the resin. The resin-impregnated carbon fibers 12d are thereafter placed on the spiral carbon fiber layer previously formed so as to extend parallel to the longitudinal direction of the mandrel, thereby forming the outermost axial carbon fiber reinforced resin layer 4a.

Thus, a carbon fiber reinforced resin layer lamination 50 in which the desired number of axial and spiral carbon fiber reinforced resin layers 4a and 4b are formed on the mandrel 26 is formed.

The above-described process was actually carried out, as described below. An aluminum honeycomb structure body (a product of Showa Aircraft Industry Co., Ltd. having a commercial name: AL1/8-5052-.002) was used as the honeycomb structure body 2. The honeycomb structure body 2 had a
of 18×18 mm.

Carbon fibers having a diameter of 7 μm, a strength of 340 kg/mm² were used as reinforcing fibers. A resin liquid with which carbon fibers were impregnated was prepared by adding 10% by weight of calcium carbonate to a matrix resin having 100 wt % of epoxy resin and was poured into the resin impregnation baths 20, 30, and 40.

As described above, the five-layer carbon fiber reinforced resin layer lamination 50 is formed in which on the honeycomb structure body 2 are formed, from the innermost position, the axial carbon fiber reinforced resin layer 4a, the spiral carbon fiber reinforced resin layer 4b, the axial carbon fiber reinforced resin layer 4a, the spiral carbon fiber reinforced resin layer 4b, and the carbon fiber reinforced resin layer 4a, each layer being formed of the resin-impregnated carbon fibers.

The carbon fiber reinforced resin layer lamination 50 formed on the honeycomb structure body 2 is then drawn into a mold 50 having a rectangular sectional shape.

The fiber reinforced resin lamination 50 formed suitably by the mold 52 to have the desired shape and size is solidified (set) after being heated by a heater (not shown), thereby forming a carbon fiber reinforced composite resin pultrusion-formed piece 1. An extracting unit 54 and a cutter 56 are disposed on the downstream side of the mold 52. The carbon fiber reinforced composite resin pultrusion-formed piece 1 is thereby extracted and cut by a predetermined length. The structures and the functions of the extracting unit 54 and the cutter 56 are well known by persons skilled in the art and the description for them is therefore omitted.

A carbon fiber reinforced resin pultrusion-formed piece in which the outside size was 23×23 mm, the thickness of each carbon fiber reinforced resin layer was 0.5 mm and the lamination thickness was 2.5 mm was manufactured at a speed of 1 m/min. by using the manufacture method and the pultrusion forming machine described above.

The strength of the pultrusion formed piece 1 thereby manufactured was practically sufficient.

As described above, the elongated lightweight fiber reinforced composite resin pultrusion-formed piece in accordance with the present invention is markedly improved in the strength (buckling resistance) against compression and bending in a transverse direction as well as in the axial direction, as compared with the conventional formed piece. Also, the manufacture method of the present invention enables this type of fiber reinforced composite resin pultrusion-formed piece to be easily manufactured continuously.

What is claimed is:

1. An elongated lightweight fiber reinforced composite resin pultrusion-formed piece with a rectangular sectional shape comprising an elongated lightweight honeycomb structure with a rectangular sectional shape and a plurality of fiber reinforced resin layers formed to cover the whole outer peripheral surface of said lightweight honeycomb structure body, said reinforced resin layers comprising an axial fiber layer formed by aligning reinforcing fibers parallel to the longitudinal axis of the lightweight honeycomb structure body and a spiral fiber layer formed by spirally winding reinforcing fibers around said lightweight honeycomb structure body.

2. An elongated lightweight fiber reinforced composite resin pultrusion-formed piece according to claim 1, wherein a bonding layer connects at least portions of the outer peripheral surface of said honeycomb structure body and said fiber reinforced resin layers by being interposed therebetween.

* * * * *